United States Patent [19]
Burel

[11] Patent Number: 5,408,585
[45] Date of Patent: Apr. 18, 1995

[54] INTERNAL CONNECTION METHOD FOR NEURAL NETWORKS

[75] Inventor: Gilles Burel, Rennes, France

[73] Assignee: Thomson-CSF, Puteaux, France

[21] Appl. No.: 275,323

[22] Filed: Jul. 14, 1994

Related U.S. Application Data

[63] Continuation of Ser. No. 944,482, Sep. 14, 1992, abandoned.

[30] Foreign Application Priority Data

Sep. 20, 1991 [FR] France .................. 91 11612

[51] Int. Cl.⁶ .................................... G06F 15/18
[52] U.S. Cl. .......................... 395/21; 395/23; 395/24
[58] Field of Search ..................... 395/21, 23, 24

[56] References Cited

U.S. PATENT DOCUMENTS

4,315,319  2/1982  White ................... 364/571.07
4,991,092  2/1991  Greensite ............. 364/413.13

OTHER PUBLICATIONS

Fukushima K. A Neural Network for Visual Pattern Recognition FIG. 1 IEEE Mar. 1988.
J. F. Shepanski Fast Learning in Artificial Neural Systems: Multilayer Perception Training Using Optimal Estimation–IEEE Conference On Neural Network–Jul. 24–27 1988.
O. N. Mian et al, "Convergence Properties of a Pulsed Neural Network", IJCNN Int'l Joint Conf. on Neural Networks, IEEE, N.Y., vol. II, 1990 pp. 599–609.

*Primary Examiner*—David D. Knepper
*Assistant Examiner*—Richemond Dorvil
*Attorney, Agent, or Firm*—Meltzer, Lippe, Goldstein, et al.

[57] ABSTRACT

A method of internal connection for neural network linking successive neuron layers and useful in image analysis and image and signal processing is provided. The neuron output states of a new neuron layer are represented by functions obtained by the method. A weighted summation of functions which represent the output state of a neuron from a preceding layer is carried out. A saturation function is applied to the result of the weighted summation. A function is outputted which is representative of the output state of the neuron layer.

10 Claims, 5 Drawing Sheets

INTERNAL CONNECTION METHOD FOR NEURAL NETWORKS

This is a continuation of application Ser. No. 07/944,482, filed Sep. 14, 1992, now abandoned.

BACKGROUND OF THE INVENTION

The present invention relates to an internal connection method for neural networks, having particular application to prediction tasks or to observation vector dimension reduction in, for example, the image processing and analysis fields. More generally, it can be applied to techniques employing multi-layer neural network modelling structures.

Over the last few years, a large number of neural network models have been proposed. Among these, the model that seems to be of most interest for industrial applications is the multi-layer Perceptron which is particularly discussed in an article by D. E. Rumelhart, G. E. Hinton and R. J. Williams "Learning internal representations by error back propagation" in the book "Parallel Distributed Processing" Cambridge: MIT Press, 1986. This structure is an assembly of individual units called "neurons" or "automata". The neurons are organized into layers, each layer receiving the outputs from the preceding layer at its inputs. A learning algorithm known as a gradient back-propagation algorithm has been proposed for this type of network. This algorithm is discussed in the abovementioned article.

Even though the multi-layer Perceptron's performance is satisfactory as regards classification tasks, the same does not apply to tasks involving prediction or, notably, space dimensional reduction. The multi-layer Perceptron performs badly in these fields because of its poor ability to handle non-linear problems.

SUMMARY OF THE INVENTION

The aim of the invention is to overcome the above-cited disadvantages. The invention hence provides an internal connection method for neural networks linking successive neuron layers, each layer receiving the outputs from the layer of immediately lower rank at its inputs, the method consisting in representing the output states of the neurons by a function, said function being obtained by the steps comprising: carrying out a weighted summation of functions, each of said functions representing the output state of a neuron from the preceding layer, then, in a second step, applying a saturating function to the result of said summation, and, in a third step, applying a distribution function to the result after application of the saturating function.

The principal advantage of the invention is that it improves the ability of the multi-layer Perceptron to handle non-linear problems with a notable improvement in the Perceptron's prediction and dimension-reducing performance.

BRIEF DESCRIPTION OF THE DRAWINGS

Further features and advantages of the invention will become more clear from the description that follows in conjunction with the attached drawings in which:

FIG. 4b illustrates the structure of the neural network used to obtain the results shown in FIG. 4a.

DETAILED DESCRIPTION OF THE INVENTION

Figure 1A:
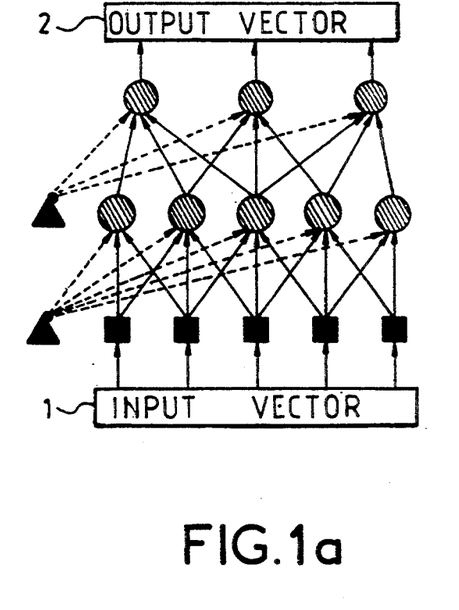
FIG. 1a shows the organisation of neurons in layers in accordance with the multi-layer Perceptron structure.

FIG. 1a shows how neurons are organized in layers in accordance with the structure of the multi-layer Perceptron. An input vector 1 supplies information to input units symbolized by arrows. There are no internal connections within the layers.

Each neuron receives the outputs from the layer of immediately lower rank at its inputs. Generally, a so-called threshold neuron, having no inputs, whose output is always 1, and which is symbolized by a triangle, is provided on each layer, except at output vector 2 level, in order to improve the network's capacity by thus adding a degree of freedom.

Figure 1B:
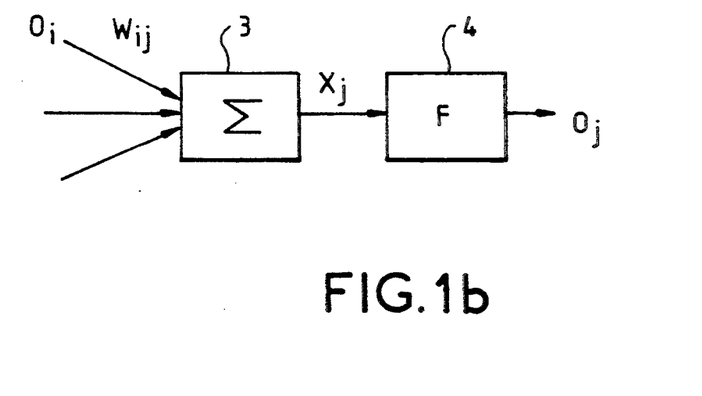
FIG. 1b illustrates a neuron connection model.

FIG. 1b shows one way of connecting neurons in association with the multi-layer Perceptron's structure, and proposed by Rumelhart et al. It consists of a summing element 3 and a non-linear transition function 4, of the tangential hyperbolic type, for example. $O_i$ stands for the output state of a neuron i from the preceding layer, $O_j$ is the output state of a neuron j forming part of the next layer, the three arrows at the input to summing element 3 symbolizing the connections to the neurons of the preceding layer. $W_{ij}$ stands for the weighting coefficient associated with the connection between neuron i and neuron j. $X_j$, the result of the weighted sum 3, is called the potential of neuron j. If we use F to stand for the transition function 4 of the neuron, and pred (j) stands for the set of neuron j's predecessors, then, using this notation, we can write:

$$X_j = \sum_{i \epsilon pred(j)} W_{ij} O_i \text{ and } O_j = F(X_j)$$

the symbol $\epsilon$ indicating that i belongs to the set pred (j).

Figure 2A:
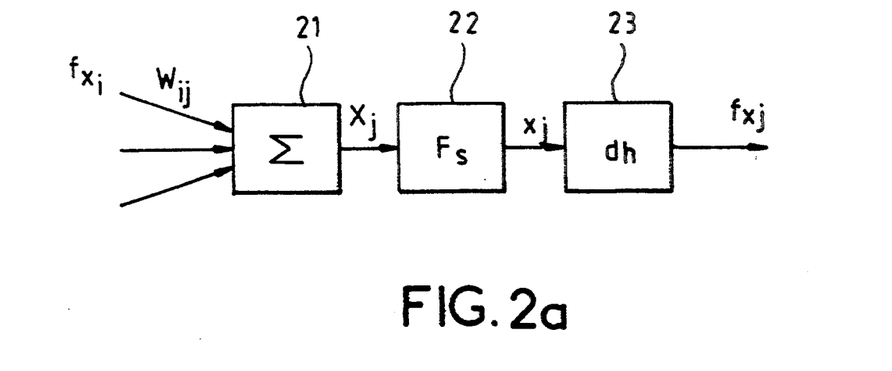
FIG. 2a shows a neuron connection model in accordance with the invention.

FIG. 2a shows a connection model in accordance with the invention. The neuron output states are no longer indicated by scalar quantities as before, but by functions. The connection method according to the invention consists, in a first step 21, of providing the weighted sum of the functions $f_{xi}$ representing neurons i from the preceding layer. If the function $W_{ij}$ stands for a weight continuum characterizing the connection between the neurons i and j, then, at the end of this first step 21, the potential $X_j$ associated with neuron j is given by the relation:

$$X_j = \sum_{i \epsilon pred(j)} \int_{-\infty}^{+\infty} W_{ij}(u) f_{xi}(u) du$$

pred (j) having been defined previously.

In a second stage 22, the result $X_j$ of this weighted sum is mathematically treated by a saturating function $F_s$, the result from which is given by $x_j$, $x_j = F_s(X_j)$, $F_s$ being, for example, of the tangential hyperbolic type a third step 23, a distribution function $d_h$ is applied to the value $x_j$ in order to obtain the output function that characterizes the output state of neuron J, $f_{xj}$ standing for this function. The distribution function $d_h$ employed in the third step is a function that applies the set of real numbers R into all the applications of R within R, and associates with every real number x the result of the convolution product of the Dirac delta function centered on x, represented by $\delta_x$, with an even and aperiodic function represented by h. Using the above notations, we have, for each real number x:

$$f_x = d_h(x) = \delta_x * h$$

where $\delta_x * h$ stands for the convolution product of the function $\delta_x$ by the function h. In this case, for all real numbers x and y, $$f_x(y) = h(y-x) = h(x-y) \quad (1).$$

The distribution function $d_h$ is hence determined entirely by knowledge of the function h. Below, the function $f_x$ will be called the distributed scalar representation of x. Function h can in practice be a smoothing filter, for example.

Figure 2B:
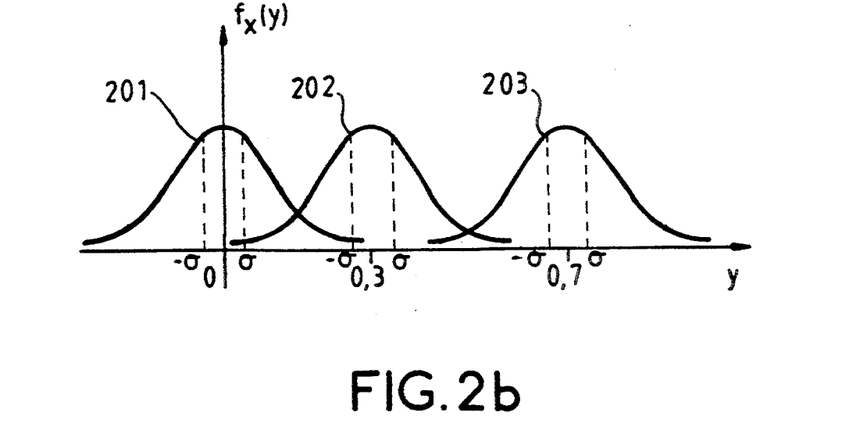
FIG. 2b shows examples of distributed scalar functions.

FIG. 2b shows several distributed scalar representations in the case where, for example, h is a function that generally follows a Gaussian curve. The y-axis is the set of real numbers, the axis marked $f_x(y)$ is the set of images of the real numbers resulting from application of the function $f_x$. Curve 201 shows the shape of the function $f_x$ for $x=0$, curve 202 shows the shape of the function $f_x$ for $x=0.3$ and curve 203 shows the shape of function $f_x$ for $x=0.7$.

How the network according to the invention works will be better understood from the following examination of a connection between a neuron i and a neuron j. Starting from the expression for potential $X_j$, it is possible to obtain the relation:

$$X_j = \sum_{i \in pred(j)} s_{ij}(x_i) \quad (2)$$

with $s_{ij}(x_i) = \int_{-\infty}^{+\infty} W_{ij}(u) f_{xi}(u) du$ $$s_{ij}(x_i) = \int_{-\infty}^{+\infty} W_{ij}(u) h(x_i - u) du,$$

in accordance with relation (1).

This latter relation in fact represents the convolution product of the function h by the function $W_{ij}$ applied to the real number $x_i$, in other words:

$$s_{ij}(x_i) = (h * W_{ij})(x_i) \quad (3)$$

Thus, by grouping together the distribution function for neuron i with the weight continuum $W_{ij}$ characterizing the connection between neuron i and neuron j, this connection appears as the result of filtering the weight continuum by the distributed scalar representation generating function. If we write $C_{ij} = h * W_j$, it is possible to describe the connections that terminate at neuron j by the following sequence of operations, using the preceding notations:

$$X_j = \sum_{i \in pred(j)} C_{ij}(x_i)$$

$$x_i = F_S(X_j)$$

One way of expressing the effect of distributed scalar representation is to consider that the connection is an adaptive function and no longer a simple adaptive gain like in the case of a conventional neural model, thus making it possible to deal more effectively with problems of non-linearity.

It is still however possible to represent a weight continuum in practice. According to the invention, we thus represent the weights by a sampled function. This sampled function between neuron i and neuron j is defined and expressed in the following manner:

$$W_{ij}^*(u) = \sum_{n=-\infty}^{+\infty} W_{ij,n} \delta(n-u)$$

where n is a relative whole number, $W_{ij,n}$ is the value of the continuum of weight $W_{ij}$ at point n, and $\delta$ is the Dirac delta function.

From relation (3), using the previous notations, the function $s_{ij}$ that links the potential $X_j$ of a neuron j to the value $x_i$ of a neuron i of the preceding layer is defined in the following manner: $s_{ij}(x_i) = (h * W_{ij}^*)(x_i)$ giving $$s_{ij}(x_i) = \int_{-\infty}^{+\infty} \left( \sum_{n=-\infty}^{+\infty} W_{ij,n} \delta(n-u) \right) f_{xi}(u) du$$

as $W_{ij,n}$ is constant: we obtain:

$$s_{ij}(x_i) = \sum_{n=-\infty}^{+\infty} W_{ij,n} \int_{-\infty}^{+\infty} \delta(n-u) f_{xi}(u) du$$

by setting:

$$f_{xi,n} = \int_{-\infty}^{+\infty} \delta(n-u) f_{xi}(u) du \quad (4)$$

we obtain:

$$s_{ij}(x_i) = \sum_{n=-\infty}^{+\infty} W_{ij,n} f_{xi,n} \quad (5)$$

Figure 2C:
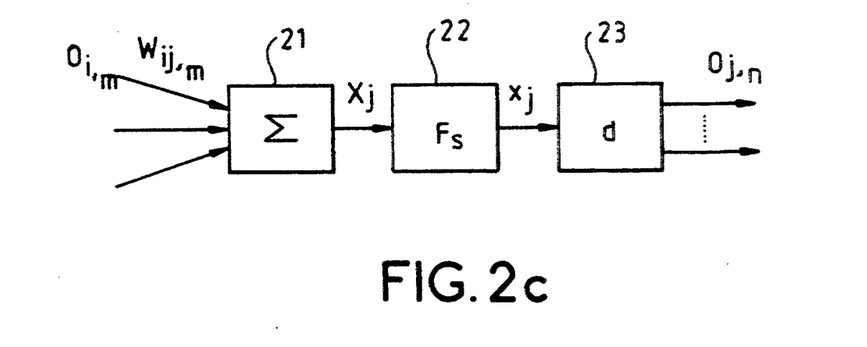
FIG. 2c shows a neural model with sampling in accordance with the invention.

The neural model with sampling is shown in FIG. 2c. The summing function of step 21, the saturating function of step 22 and the distribution function of step 23 are the same ones as before, n and m being relative whole numbers, $$O_{j,n} = f_{xj,n} \text{ and } O_{i,n} = f_{xi,m}$$

$W_{ij,m}$ being the value of weight continuum $W_{ij}$ at sampling m. At the output from step 23, instead of a single arrow as in the previous cases, there are now two arrows separated by a dotted line that symbolizes sampled values obtained, of which $O_{j,n}$ is one particular value. The improvement in the neural network's internal connection can be clearly seen here as, instead of the neuron's output being represented by a single value, it is now represented by a sequence of sampled values with an accompanying improvement in accuracy and a higher suitability to the various types of processing involved.

As FIG. 2b shows, the filtering function h is generally a Gaussian function with only a small standard deviation.

Figure 5:
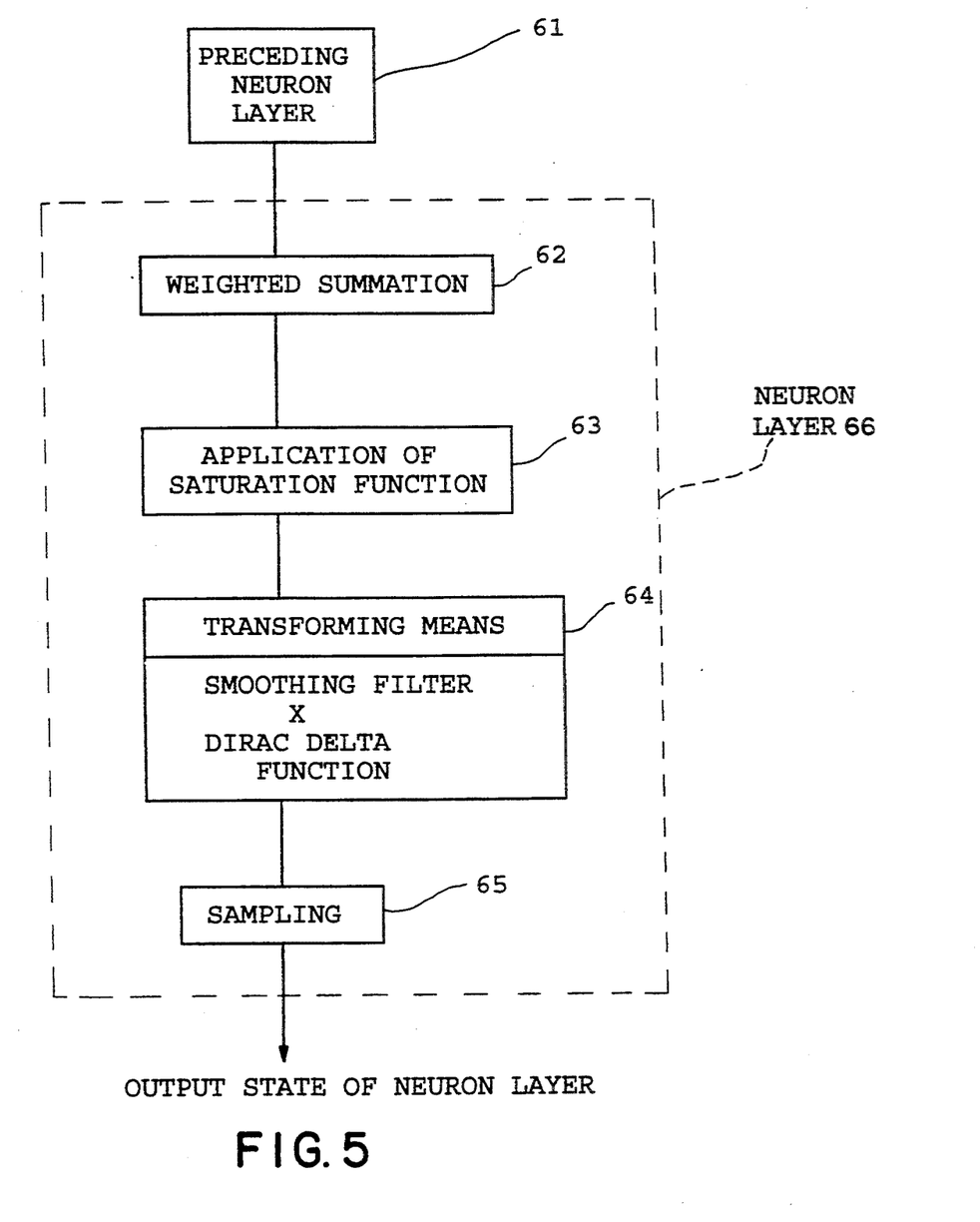
FIG. 5 shows a flow chart of the method according to the invention.

Referring to FIG. 5, the method according to the invention is shown in the flow chart. Inputs as functions are received from the preceding neuron layer by the present neuron layer 66. A weighted summation 62 of the inputs is determined. Then a saturation function 62 is applied to the weighted summation. To the results of the saturation function, a distribution function 64 is applied. The distribution function can involve transforming the weighted summation by a convolution product of a smoothing filter and a Dirac Delta function. The result of this transformation can then be sampled 65, resulting in output functions representative of the output sate of the neuron layer.

Figure 3:
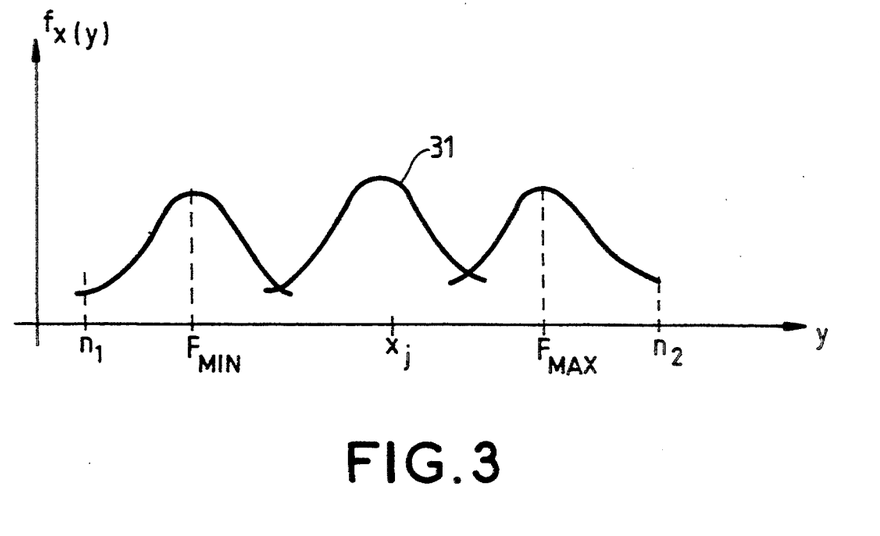
FIG. 3 shows the segmentation of a distributed scalar function.

From FIG. 3, it can be seen that outside the interval $[n_1, n_2]$, the value of $f_x(y) = h(x-y) = h(y-x)$ is always small, meaning that weights $W_{ij,n}$ where n is outside the range $[n_1, n_2]$ have little influence in the product $W_{ij,n} f_{xi,n}$ of relation (5). For values of n outside the $[n_1, n_2]$, the values of weights $W_{ij,n}$ can hence be set to zero. In practice, the limits of range $[n_1, n_2]$ would be chosen so as to enclose asymptotic values of saturating function $F_s$. In FIG. 3, $F_{MIN}$ and $F_{MAX}$ are the upper and lower saturation or asymptotic values of saturating function $F_s$. For the tangential hyperbolic function for example, $F_{MIN} = -1$ and $F_{MAX} = +1$. In line with the notation established above, we can now write:

$$s_{ij}(x_i) = \sum_{n=n_1}^{n_2} W_{ij,n} O_{i,n} \quad (6)$$

Having now established the connection model, a learning algorithm needs to be defined. It is necessary to provide this learning phase in order that, regardless of the input to the net, the states of the output neurons are adapted to this input. The learning algorithm defined according to the invention is a gradient algorithm inspired by the back-propagation algorithm discussed in the article by Rumelhart et al cited above.

In the learning algorithm defined according to the invention, a mean value $e_{QM}$ for the squares of the errors is, for example, defined between the target outputs $(t_j)$ and the outputs actually obtained $(x_j)$:

$$e_{QM} = E\{e_Q\}$$

The operator $E\{\ \}$ computes an average value for the values $e_Q$ defined by:

$$e_Q = \frac{1}{2} \sum_{j \in s} (x_j - t_j)^2 \quad (7)$$

s identifying all the output neurons.

During the learning phase, all the examples are fed in several times in a random order. Each time an example is presented, the weights $W_{ij,n}$ vary in the opposite sense to the error gradient: denoting this variation by $\Delta W_{ij,n}$:

$$\Delta W_{ij,n} = -\alpha \frac{\partial e_{QM}}{\partial W_{ij,n}},$$

$\alpha$ being a positive constant, and a reduction in error is thus ensured. The local gradient of the error of the squares will be written as $g_{ij,n}$ below.

$$g_{ij,n} = \frac{\partial e_Q}{\partial W_{ij,n}}$$

As $e_{QM} = E\{e_Q\}$, it is possible to write:

$$\Delta W_{ij,n} = -\alpha E\left(\frac{\partial e_Q}{\partial W_{ij,n}}\right)$$

as differentiation is a linear operator. We consequently obtain: $\Delta W_{ij,n} = -\alpha E\{g_{ij,n}\}$ In order to carry out the learning phase, it is hence necessary to know the gradients $g_{ij,n}$ of the error with respect to a weight:

$$g_{ij,n} = \frac{\partial e_Q}{\partial W_{ij,n}} = \frac{\partial e_Q}{\partial X_j} \frac{\partial X_j}{\partial W_{ij,n}}$$

$$\text{now } \frac{\partial X_j}{\partial W_{ij,n}} = O_{i,n},$$

from relations (2) and (6).

Thus, by setting $$\delta_j = -\frac{\partial e_Q}{\partial X_j},$$

we obtain $g_{ij,n} = -\delta_j O_{i,n}$

All that is needed now to obtain $g_{ij,n}$ is to define $\delta_j$. By applying elementary rules of differential calculus, it is seen that $\delta_j$ can be expressed as a function of the terms:

$$\delta_k = \frac{\partial e_Q}{\partial X_k}$$

relative to the neurons k of the layer following it. In effect:

$$\delta_j = \frac{\partial e_Q}{\partial X_j} = -\frac{\partial e_Q}{\partial x_j} \frac{\partial x_j}{\partial X_j}$$

$$x_j = F_s(X_j) \text{ hence } \frac{\partial x_j}{\partial X_j} = F_s'(X_j)$$

and $$\delta_j = -\frac{\partial e_Q}{\partial x_j} F_s'(X_j)$$

$$\frac{\partial e_Q}{\partial x_j}$$

can be expressed as $$\frac{\partial e_Q}{\partial x_j} = \sum_{n=n_1}^{n_2} \frac{\partial c_Q}{\partial O_{j,n}} \frac{\partial O_{j,n}}{\partial x_j}, [n_1, n_2]$$

being the previously-defined interval.

$$\frac{\partial e_Q}{\partial O_{j,n}}$$

can be written as $$\sum_{k=succ(j)} \frac{\partial e_Q}{\partial X_k} \frac{\partial X_k}{\partial O_{j,n}},$$

succ (j) identifying the neurons of the layer immediately following the layer where neuron j is situated.

$$\frac{\partial e_Q}{\partial O_{j,n}} = \sum_{k=succ(j)} -\delta_k W_{jk,n} \text{ since}$$

$$\frac{\partial e_Q}{\partial X_k} = -\delta_k \text{ and } \frac{\partial X_k}{\partial O_{j,n}} = W_{ik,n},$$

from relations (2) and (6). Additionally, $$\frac{\partial O_{j,n}}{\partial x_j} = h'(x_j - n).$$

In effect, $O_{j,n}=f_{xj,n}$, and from relations (1) and (4)

$$\frac{\partial f_{xj}}{\partial x_j} = h'(x_j - n)$$

which gives the following expression for δj in terms of the δk's for the neurons k of the following layer:

$$\delta_j = \left[ \sum_{n=n1}^{n2} \left( \sum_{k=succ(j)} \delta_k W_{jk,n} \right) h'(x_j - n) \right] F_s'(X_j)$$

For the particular case of the last layer, δj is readily expressed as a function of the type of error that is chosen, as, in effect:

$$\delta_j = \frac{\partial e_Q}{\partial x_j} \frac{\partial x_j}{\partial X_j}.$$

Now, from relation (7), for the neurons j belonging to the last layer:

$$\frac{\partial e_Q}{\partial x_j} = (x_j - t_j).$$

We consequently have $\delta_j = -(x_j - t_j)F_s(X_j)$.

Thus, using iteration and making use of the successive quadratic errors between the target outputs and the actual outputs obtained, it is possible to determine the coefficients $W_{ij,n}$, this constituting the learning phase.

Figure 4A:
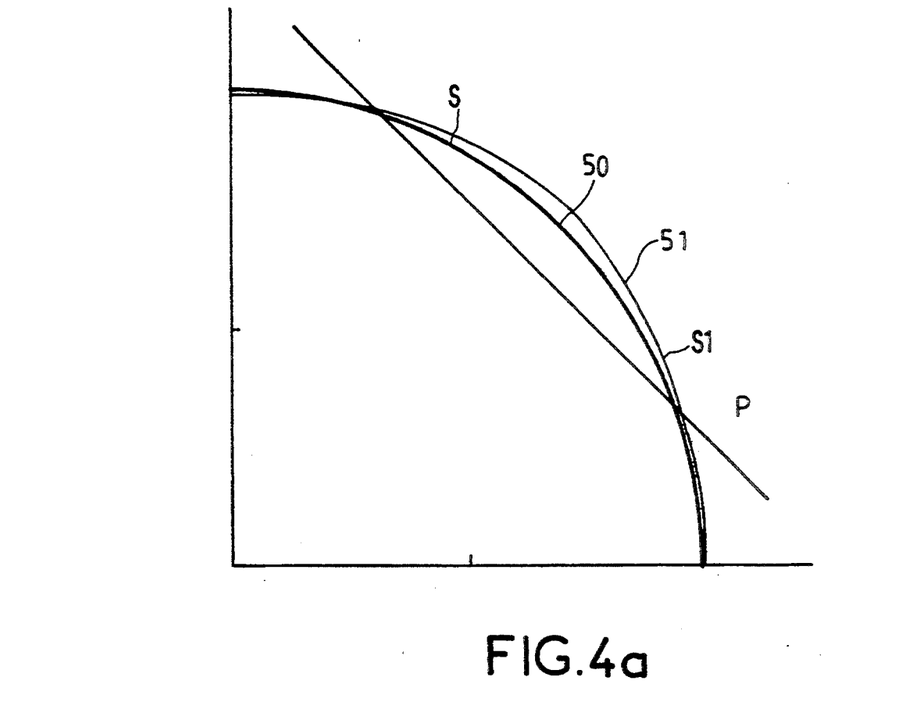
FIG. 4a shows results obtained by application of the method according to the invention.

The method according to the invention can advantageously be applied to space dimension reduction, notably in signal processing for example. Thus, in numerous signal processing applications, observation is effectively represented by a vector belonging to a space of dimension N. The components of this vector are very frequently not independent and are in reality limited to a hyper-surface of dimension M, M being less than N. Some methods of analysis do in fact allow this hyper-surface to be approximated to a hyper-plane. When the hyper-surface is highly curved however, this approximation is not satisfactory, and currently no satisfactory method is in existence. The method according to the invention enables satisfactory results to be obtained. The example that follows considers a two-dimensional case, but is representative of any other higher-dimension problem. In FIG. 4a, the hyper-surface S is represented by a quarter of a circle of unit radius 50.

Figure 4B:
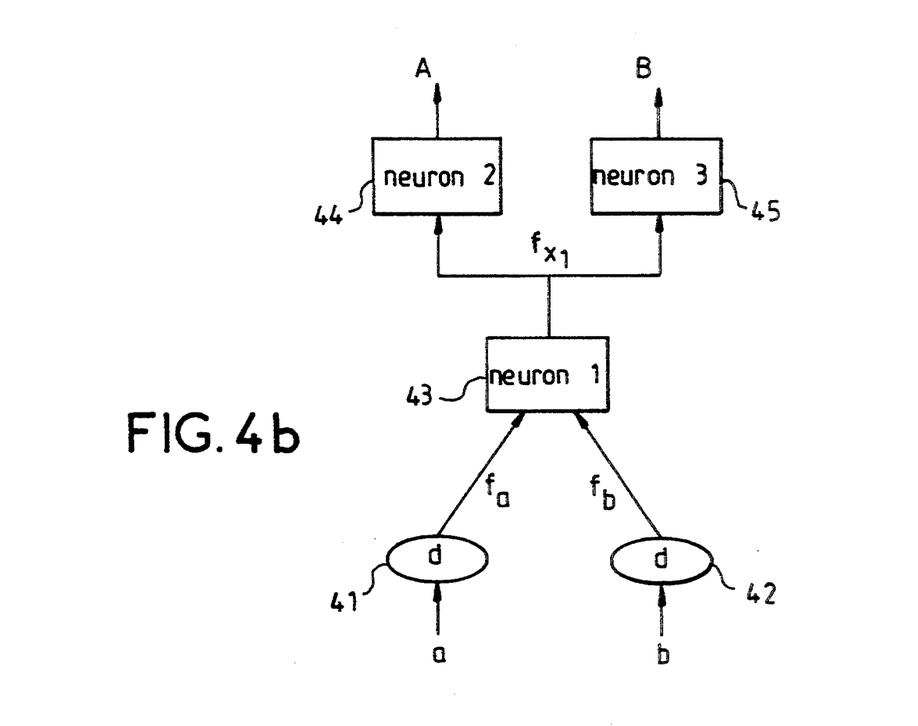

The data to be processed are synthetic data represented by vectors with coordinates (a,b) chosen at random over the quarter S of the circle in accordance with a uniform law that is a function of, for example, angle. FIG. 4b shows the neural net employed in accordance with the invention, a and b being the input data. The d functions, 41 and 42, are distribution functions yielding the distributed scalar representation functions $f_a$ and $f_b$ defined as in relation (1), neurons 43, 44 and 45 being connected in accordance with the method of the invention. Function $f_{x1}$ is the distributed scalar representation function representing the state of neuron 1, indicated by reference numeral 43. A and B are the values obtained at the output from the net. During the learning phase, the net is set up by a self-associative method, meaning that the target values required at the output from the network are equal to the data supplied at the network's input; in this case, if a and b are input data and A and B are the output data obtained, the error $e_Q$ of the squares is given by the following relation:

$$e_Q = \frac{1}{2}[(A-a)^2 + (B-b)^2].$$

As in this network, all information must of necessity pass via neuron 1 indicated by 43 in FIG. 4b, the problem to be computed is reduced to a dimension 1 problem, this giving a satisfactory result as the plot of the output coordinates (A, B) obtained, represented by curve S1 designated as 51, of FIG. 4a is a satisfactory approximation of the target output coordinates represented by curve S. Another solution that consisted of processing the same data with a conventional neural net that was not connected as per the invention, and even though it enabled the dimension to be reduced to 1, yielded an approximation represented by straight line P.

The method according to the invention can also be employed in the field of prediction, where it considerably improves performance. The good results obtained by this method in the processing of non-linear problems are principally due to the fact that the connections behave like adaptive functions and no longer like simple adaptive gains. For example, the smoothing function h of relation (1) employed to define the distribution function can be defined by the Gaussian function:

$$h(u) = \frac{1}{\sqrt{2\pi}\sigma} e^{-\frac{u^2}{2\sigma^2}}$$

and adapted as a function of the particular problem that is to be processed by making changes to the standard deviation a which in general is of the order of unity.

What is claimed is:

1. An internal connection method for neural networks, comprising
    linking successive neuron layers, each layer having at least one input and at least one output, wherein said neuron layers are connected so that the output of one neuron layer is connected to the input of a successive neuron layer,
    each neuron layer receiving at said inputs, output functions from a preceding neuron layer, using a weighted summer to carry out a weighted summation of said output functions which represent an output state from the preceding neuron layer, using a saturation function stage means to apply a saturation function to said weighted summation, and using a distribution function stage to apply a distribution function to said saturated summation and outputting a function representative of output states of said neuron layer.

2. The method according to claim 1, further comprising said distribution function stage transforming each weighted summation obtained by said saturation function stage into a function that is a convolution product of a smoothing filter function by a Dirac delta function centered on said weighted summation.

3. The method according to claim 2, wherein said smoothing filter function is substantially a Gaussian function.

4. The method according to claim 1, further comprising representing the weights of said weighted summation by a sampled function.

5. The method of claim 4, further comprising setting sampled weights of said summation function that are outside an interval enclosing asymptotic values of the saturating function to zero.

6. A method according to claim 5, wherein said saturating function is a hyperbolic tangent.

7. The method of claim 1, wherein said saturating function is a hyperbolic tangent.

8. The method of claim 1, further comprising sampling said function representing the output state of said neuron.

9. The method according to claim 1, further comprising setting up the neural net connections during a learning phase employing a gradient algorithm.

10. A neural network comprising, a plurality of neurons arranged in layers, each neuron layer having inputs and outputs wherein each neuron layer receives output states as functions from a preceding neuron layer, and wherein each neuron layer comprises a weighted summer for obtaining a weighted summation of functions which represent said output states from the preceding neuron layer, a saturation function stage for obtaining a saturated summation by applying a saturating function to said weighted summation, and a distribution function stage for applying a distribution function to said saturated summation, wherein said distribution stage has an output which outputs a function representative of output states of said neuron layer.

* * * * *